W. E. MADDEN.
FAUCET.
APPLICATION FILED AUG. 23, 1921.
1,411,972.
Patented Apr. 4, 1922.
2 SHEETS—SHEET 1.
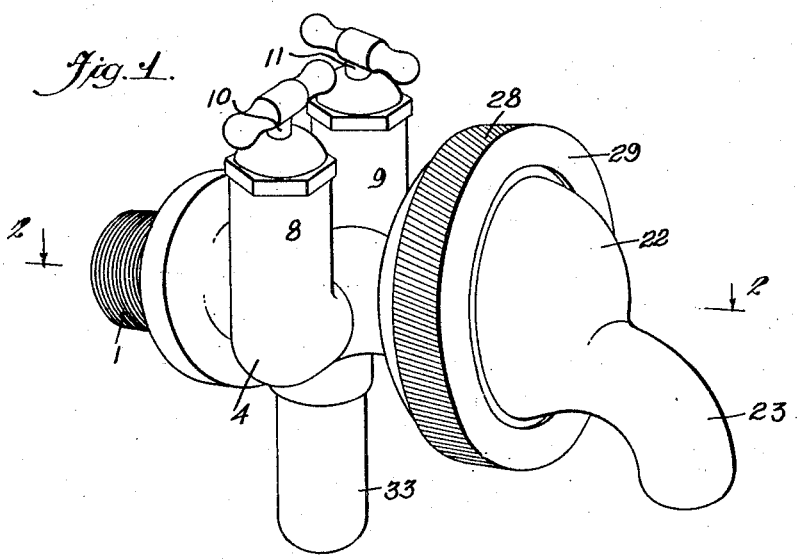
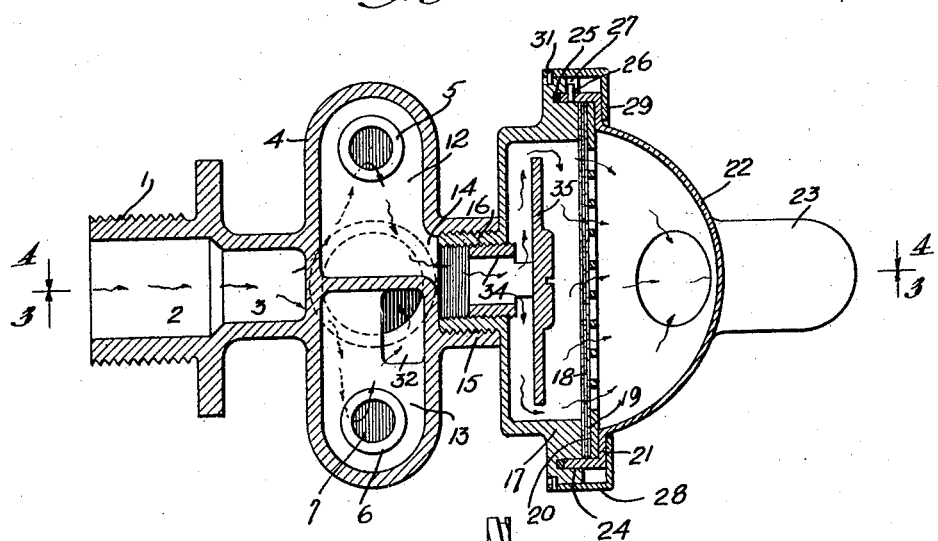
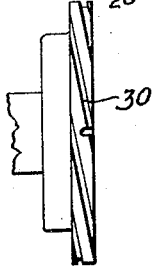
INVENTOR
WILLIAM E. MADDEN
BY
ATTORNEYS W. E. MADDEN.
FAUCET.
APPLICATION FILED AUG. 23, 1921.
1,411,972.
Patented Apr. 4, 1922.
2 SHEETS—SHEET 2.
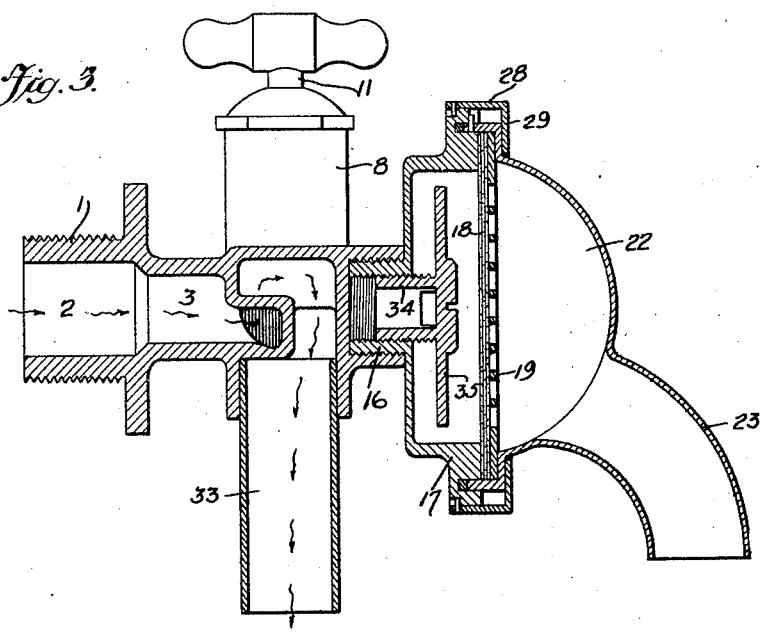
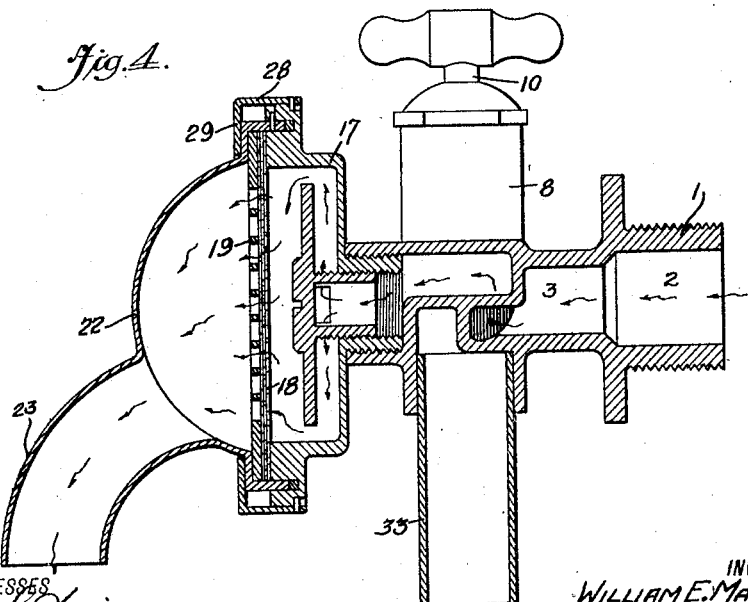
INVENTOR
WILLIAM E. MADDEN
BY
ATTORNEYS

UNITED STATES PATENT OFFICE.

WILLIAM E. MADDEN, OF NEW YORK, N. Y.

FAUCET.

1,411,972.   Specification of Letters Patent.   Patented Apr. 4, 1922.

Application filed August 23, 1921. Serial No. 494,669.

*To all whom it may concern:*

Be it known that I, WILLIAM E. MADDEN, a citizen of the United States, and a resident of the city of New York, borough of Manhattan, in the county and State of New York, have invented a new and Improved Faucet, of which the following is a full, clear, and exact description.

This invention relates to a faucet, and has for an object the provision of a faucet whereby both filtered and unfiltered liquid may be readily obtained.

Another object resides in the provision of means whereby the filtering device may be very quickly assembled and disassembled for cleaning and repair.

A further object resides in the provision of a device in which the expense and labor involved in the manufacture thereof is reduced to a minimum.

A still further object resides in the provision of a device which can be, with a minimum of effort, attached to any suitable source of liquid supply.

Another object resides in the particular construction and arrangement of parts which are hereinafter described and claimed and shown in the accompanying drawings.

The invention is illustrated in the drawings, in which—

Figure 1 is a perspective view of the faucet;

Figure 2 is a horizontal section taken on the line 2—2 of Figure 1;

Figure 3 is a vertical section taken on the line 3—3 of Figure 2;

Figure 4 is a vertical section taken on the line 4—4 of Figure 2; and

Figure 5 is an enlarged detail showing part of the means whereby the parts may be quickly assembled.

One of the inventive ideas consists in the provision of two faucets, one for unfiltered water and the other for filtered water. Both are connected to one and the same water supply, chambers within the device being provided whereby two paths are provided for the water, and in each path regulating devices are disposed. By one path the water flows directly out, while by the other it leads first through a filtering device.

As shown in the drawings, the preferred embodiment of my invention comprises a faucet having a threaded nipple 1 which may be attached to any suitable piping or source of water supply. The threading on this nipple is standard, so that it may be screwed into any standard faucet or pipe connection. This nipple is provided with a liquid passage 2. Adjacent the passage 2 there is disposed a chamber 3. Adjacent the chamber 3 is an enlarged portion or casing 4 which is provided therewithin with valve seats 5 and 6. The chamber 3 communicates with the chamber 7 disposed beneath the valve seats 5 and 6. The casing 4 extends upwardly, especially over the valve seats 5 and 6, in the form of hollow cylinders 8 and 9 in which suitable valve stems 10 and 11 are disposed in the usual manner to control the flow of water through the valve seats or openings 5 and 6.

A chamber 12 is formed in the casing 4 above the valve seat 5, and a similar chamber 13 is formed in the casing above the valve seat 6. The chamber 12 is connected by means of an opening 14 to a pipe 15. Into this pipe 15 the threaded end 16 of a filtering head 17 is inserted. This filtering head has an open face against which layers of filtering material, such as 18, may be placed. A perforated disk 19 of any suitable material, such as metal, is placed against the layers of filtering material 18, and these two are clamped against a flange 20 of the filtering head 17 by means of the engagement therewith of a flange portion 21 of a nozzle head 22 from which an outlet pipe 23 extends. This flange portion 21 extends into an annular groove 24 in the face of the filtering head 17. A ring of packing material, such at 25, may be placed in this groove. From one portion of the flange 21 a pin 26 extends and is adapted to lie in a slot 27 disposed in the face of the filtering head 17, at any suitable point, to definitely position the nozzle head 22 against rotation. A collar 28 provided with a flange 29 is adapted to engage with suitable screw threads 30 on the outer periphery of the filter head 17. The flange 29 of this collar bears against the outer peripheral face of the flange 21 of the nozzle head 22 to hold the nozzle head, the perforated disk 19 and the filtering material 18 against the filter head 17. The collar is provided with a plurality of pins, such as 31, which extend inwardly from the outer edge thereof to engage in the screw threads.

The chamber 13 disposed above the valve seat 6 is provided with an aperture 32 which leads directly to an outlet pipe 33. A threaded plug 34 is disposed within the threaded end 16 of the filter head. To the outer end of this plug a baffle plate or disk 35 is connected. This baffle plate is disposed in the path of the water so that the force of the water will be prevented from falling directly on the filtering material 18. In this way the life of the filtering material is greatly preserved. By manipulating either of the valves 10 and 11 in the usual manner, water will be permitted to flow either directly out through the pipe 33, in which case it is unfiltered, or will be permitted to pass through the filtering material 18 and thereby out through the outlet pipe 23.

The threads 30 are formed to provide a means whereby the collar 28 can be very quickly applied to tightly clamp the filtering medium and its co-operating parts together. Similarly, these parts can be very quickly disassembled for grinding and repair.

It will thereby be observed that I have provided a faucet device which can be attached to any suitable piping or water supply and which will furnish filtered and unfiltered water, the water flowing within the device being split up into two channels each of which is independent of the other.

It is understood that the device may be modified in construction so as to adapt it for filtering other liquids than water and separating the solid elements therefrom without, by so doing, departing from the spirit of the invention.

What I claim is:

1. A filtering device comprising a casing having a stationary and a removable section forming a chamber therebetween, flange portions on each of said sections, filtering means forming a separating device through said chamber and having its peripheral edges secured between the flange portions, one of said sections having an annular groove adapted to receive the flange portion of the other section, and resilient means in said groove adapted to be engaged by said flange.

2. A filtering device, as set forth in claim 1, further characterized by the fact that a flanged, screwthreaded collar is adjusted on the stationary section to hold the removable section and the filtering means in place.

3. A faucet device comprising a casing having a liquid inlet and a common liquid receiving chamber, a wall in said casing above said common chamber, a pair of chambers being formed in the casing above said wall, said wall having water passages leading from the common chamber to the separate chambers, liquid-controlling valves disposed in the casing and controlling the flow of water through said passages, each of said separate chambers having openings therefrom, outlet pipes connected to each of said openings, and filtering means located in one of said outlet pipes.

WILLIAM E. MADDEN.